US011650867B2

(12) United States Patent
Tidsbury et al.

(10) Patent No.: US 11,650,867 B2
(45) Date of Patent: May 16, 2023

(54) PROVIDING ACCESS TO RELATED CONTENT IN MEDIA PRESENTATIONS

(71) Applicant: Apple Inc., Cupertino, CA (US)

(72) Inventors: Joshua H. Tidsbury, San Francisco, CA (US); Lauren S. Grimm, San Francisco, CA (US); Michael P. Stern, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 16/905,604

(22) Filed: Jun. 18, 2020

(65) Prior Publication Data
US 2021/0397491 A1 Dec. 23, 2021

(51) Int. Cl.
G06F 9/54 (2006.01)
G06F 16/44 (2019.01)
G06F 16/48 (2019.01)
G06F 3/04842 (2022.01)

(52) U.S. Cl.
CPC .......... *G06F 9/543* (2013.01); *G06F 3/04842* (2013.01); *G06F 16/447* (2019.01); *G06F 16/489* (2019.01)

(58) Field of Classification Search
CPC ...... G06F 9/543; G06F 16/489; G06F 16/447; G06F 3/04842
See application file for complete search history.

(56) References Cited

U.S. PATENT DOCUMENTS

| | | | | |
|---|---|---|---|---|
| 2010/0077009 | A1* | 3/2010 | Park | G06F 16/40 707/E17.014 |
| 2011/0238507 | A1* | 9/2011 | Ben-Rubi | G06Q 30/0277 705/14.73 |
| 2012/0246594 | A1* | 9/2012 | Han | G06F 40/166 715/781 |
| 2013/0159853 | A1* | 6/2013 | Story, Jr. | G06F 3/165 715/716 |
| 2015/0324381 | A1* | 11/2015 | Brand | G06F 21/6218 707/829 |
| 2016/0071550 | A1* | 3/2016 | Daub | H04N 5/77 386/228 |
| 2016/0342449 | A1* | 11/2016 | Wong | H04L 67/1097 |
| 2017/0154188 | A1* | 6/2017 | Meier | G06F 21/552 |
| 2018/0039385 | A1* | 2/2018 | Worley | G06F 3/0486 |

* cited by examiner

*Primary Examiner* — Sherrod L Keaton
(74) *Attorney, Agent, or Firm* — Invoke

(57) ABSTRACT

In some implementations, a user device may access a media presentation that includes metadata describing related content item(s). The user device viewing the media presentation is allowed to access content related to portions of the media presentation at times appropriate for the particular related content item(s). The related content item(s) may be provided automatically or based on user input triggering download or copying of a particular related content item, such as to a clipboard of the user device. A computing device may generate a media presentation that includes related content item(s) as metadata in some implementations. The media presentation may be generated by recording a live presentation, assembling one or more media portions, and/or obtaining a complete media presentation and modifying the media presentation to add the related content item(s) and when, while presenting the media presentation on a user device, to allow access to the related content item(s).

20 Claims, 18 Drawing Sheets

PROVIDING ACCESS TO RELATED CONTENT IN MEDIA PRESENTATIONS

TECHNICAL FIELD

The disclosure generally relates to media presentations, and more particularly to providing related content during a media presentation to individual user devices viewing the media presentation.

BACKGROUND

Audio, video, and other media presentations are used to convey information and ideas to multiple people. The media presentation may include a speaker talking and being recorded, may be presented live at a single time or at any preferred time after being created. These presentations may be presented live for gatherings of people on one or more large screens, live on individual screens for individuals users, or remotely to end user devices regardless of where the user is located or when the presentation was actually performed or created.

During a presentation, information may be displayed, presented, or implied by content of the presentation that may be beneficial for a user. However, this information may be difficult to obtain by the user during the presentation due to any number of factors, including size of the information, inaccessibility of the information, duration that the information is available, etc.

SUMMARY

In some implementations, a user device may access a media presentation that includes metadata describing related content items. The user device viewing the media presentation is allowed to access content related to one or more portions of the media presentation at times appropriate for the particular related content item(s). The related content item(s) may be provided automatically or based on user input triggering download or copying of a particular related content item, such as to a clipboard of the user device.

A computing device may generate a media presentation that includes related content item(s) as metadata in some implementations. The media presentation may be generated by recording a live presentation, assembling one or more media portions, and/or obtaining a complete media presentation and modifying the media presentation to add the related content item(s) and when, while presenting the media presentation on a user device, to allow access to the related content item(s).

Particular implementations provide at least the following advantages. Content that would otherwise need to be manually copied down or electronically captured through more complicated methods is now available to users at times that are appropriate for the user, based on knowledge gained through the media presentation.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
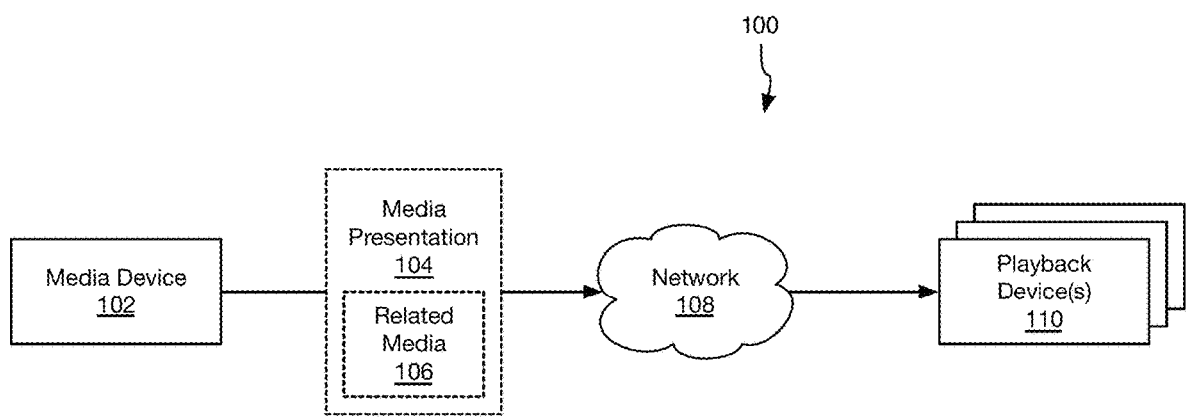
FIG. 1 is a block diagram of an example system for providing a media presentation with related content.

FIG. 1 is a block diagram of example system 100 for providing a media presentation 104 with related content items 106. System 100 includes a media device 102 and one or more playback devices 110. In some embodiments, system 100 may include a network 108 for connecting any of the various devices in system 100. As shown, network 108 electronically couples media device 102 to the playback device(s) 110.

Although a single network 108 is shown connecting media device 102 to playback device(s) 110, network 108 may be used to interconnect any number of devices in system 100. Any type of network 108 may be used to interconnect one or more devices in system 100, such as a local area network (LAN), wireless local area network (WLAN), wide area network (WAN), etc.

Each playback device 110 includes at least one processor, a computer readable storage device, and a reproduction mechanism, such as a display, a speaker, etc. In an approach, a playback device 110 may include at least one user input device (not shown), such as a mouse, trackpad, touchscreen display, microphone, motion tracking device, etc. In one approach, a playback device 110 may include a clipboard data storage functionality, to provide for copy, cut, and paste operations of data. Any type of playback device 110 capable of reproducing at least a portion of media presentation 104 may be used in system 100. For example, although media presentation 104 may include video and audio data, a playback device 110 may be capable of only reproducing the audio data of media presentation 104.

Some playback devices 110 may be configured to reproduce audio data, such as speech, conversations, singing, music, podcasts, blogs, etc. Some playback devices 110 may be configured to reproduce visual data, alone or in combination with audio data, such as images, photos, videos, vlogs, moving pictures, films, social media posts and content, streaming content, websites, etc. Moreover, different capabilities may be present on different playback devices 110 that receive the same media presentation 104. Some examples of playback devices 110 include, but are not limited to, a desktop computer, a laptop computer, a notebook computer, a touchscreen display, a television, a projector, a tablet computer, a mobile telephone, a smartphone, a wearable computing device (e.g., a smartwatch, smart glasses, etc.), etc.

The media device 102 includes at least one processor and is configured to transmit a media presentation 104 to playback device(s) 110. Media presentation 104 may be transmitted via a physical connection and/or a wireless connection in various embodiments. In one approach, media device 102 may utilize network 108 to transmit media presentation 104 to the playback device(s) 110. Any type of media device 102 may be included in system 100, such as a set-top box, networked media streaming device, laptop computer, desktop computer, server, multifunction media console, etc.

In one approach, media device 102 may receive media presentation 104 to provide to playback device(s) 110 from a particular source (not shown) via any transmission mechanism, such as wireless transmission, hard-wired connection, the Internet, etc.

In an approach, media device 102 may connect to playback device(s) 110 via a direct connection, such as a Bluetooth connection, a near-field communication (NFC) channel, and a direct Wi-Fi connection, for example.

Media presentation 104 includes presentation data that constitutes the audio data and/or visual data that are played on playback device(s) 110, along with media items 106 that are related to one or more portions of the presentation data. Related content items 106 may include any type or structure of data that may be downloaded and/or copied to playback device(s) 110, such as audio data, visual data, application data, operating system data, etc. Related content items 106 and their inclusion in a media presentation 104 are described in more detail below.

In one approach, media device 102 may include an application configured to generate and transmit a media presentation 104 that includes related content items 106 that may be received and processed by corresponding applications operating on each playback device 110. In this way, related content items 106 may be properly identified, accessed, and provided by a playback device 110 based on the application understanding how the related content items 106 are stored in association with the media presentation 104 and when to allow access and/or provide individual related content items 106 during playback of the media presentation 104 on the playback device(s) 110.

Figure 2A:
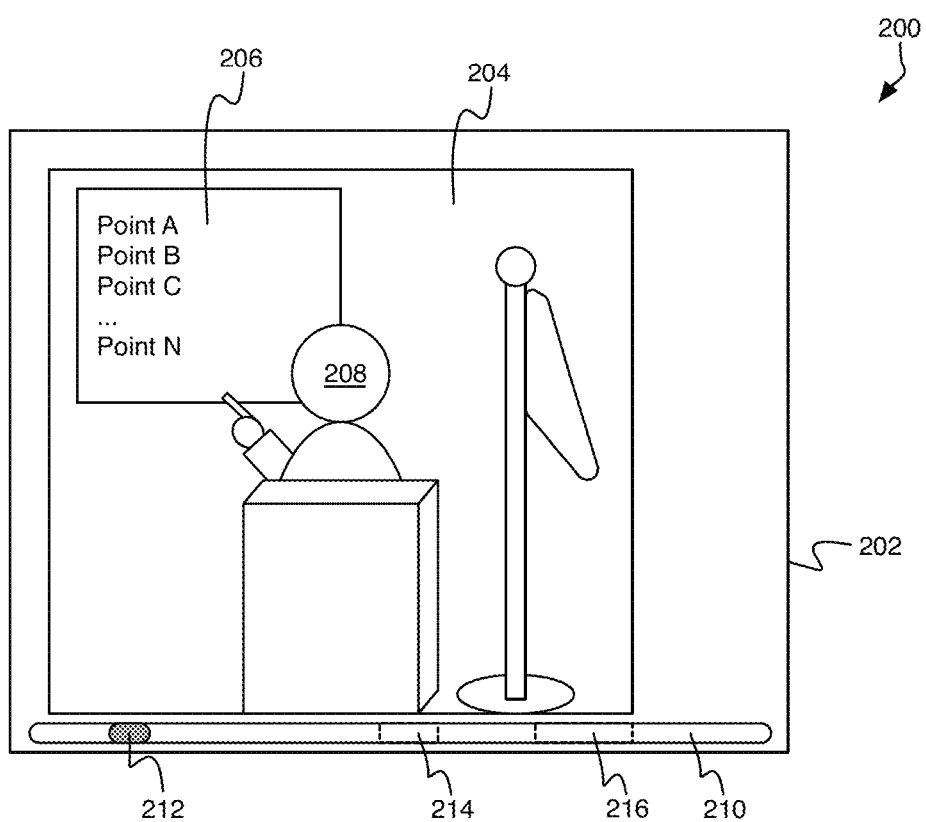
FIGS. 2A-2E show several example user interface displays for providing a media presentation with related content items.

FIGS. 2A-2E show several example user interface displays for providing a media presentation with related content items. FIG. 2A depicts display 200 that includes an application 202 presenting a media presentation 204. The media presentation 204 includes, in this particular scene, a person 208 delivering a speech with a projected image 206 shown behind the person 208 that enables additional visual information to be displayed.

Although a person 208 delivering a speech is shown in FIGS. 2A-2E, the embodiments are not so limited, as any audio and/or visual data may be included in a media presentation, with each media presentation capable of being enhanced with related content as described herein in various embodiments.

In one embodiment, the application 202 includes a progress bar 210 for indicating progress in the media presentation 204. Although a progress bar 210 is shown, any other suitable graphical representation may be included in the application for indicating progress. The progress bar 210 includes a present time indicator 212. In some approaches, portions of the media presentation 204 for which related content items are available may be indicated on the progress bar 210. For example, related content indicator 214 and related content indicator 216 each denote that related content items are available for the media presentation 204 at times which correspond with these positions on the progress bar 210.

Figure 2B:
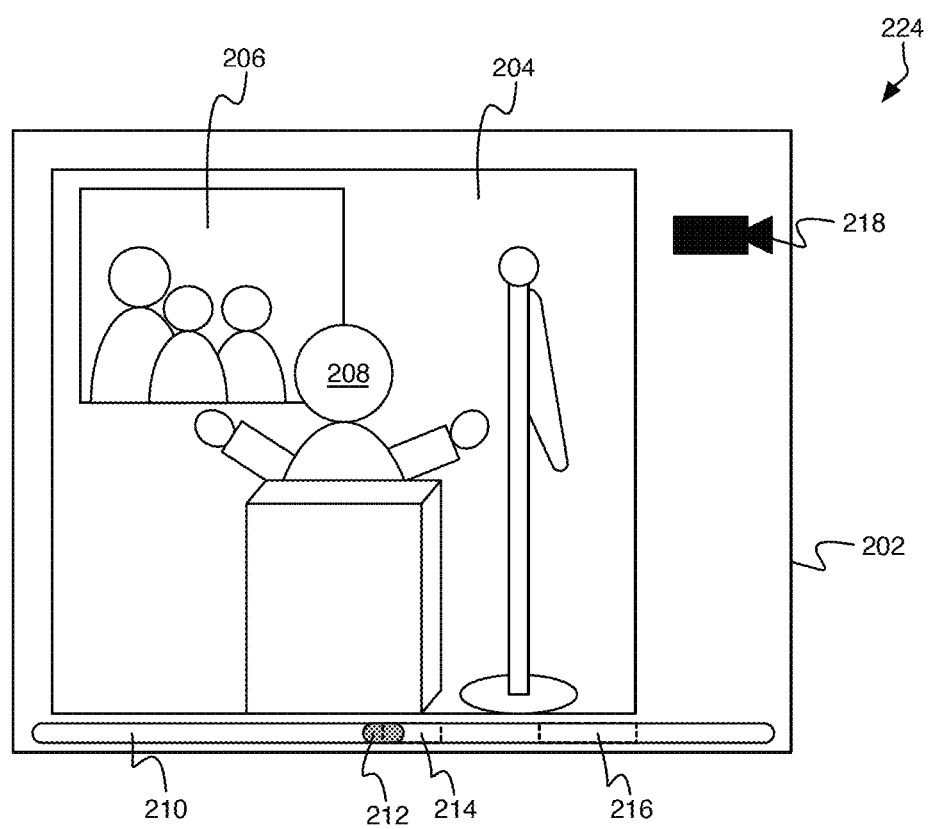

FIG. 2B depicts display 224 that includes application 202 presenting media presentation 204 at a time corresponding to related content indicator 214. Related content indicator 214 corresponds to a particular content item that is accessible to the computing device executing application 202. In various embodiments, the particular content item may be accessible to the computing device executing application 202 during certain time range(s) only.

In response to presenting a portion of the media presentation 204 by application 202 that corresponds to a time range of related content indicator 214, the particular related content item that relates to this portion of the media presentation 204 may be made available to the computing device. In one embodiment, a description of the particular related content item may be provided to the computing device responsive to the portion of the media presentation 204 corresponding to the time range of related content indicator 214 being attained.

In one approach, a user interface (UI) item 218 may be presented by application 202 responsive to the portion of the media presentation 204 corresponding to the time range of related content indicator 214 being attained. UI item 218 indicates presence of the particular related content item. Moreover, UI item 218 may provide access the particular related content item, e.g., user input selecting this UI item 218 causes download and/or copy of the particular related content item to the computing device.

In an approach, the particular related content item may be copied to a clipboard of the computing device responsive to user input selecting the UI item 218. In another approach, the particular related content item may be downloaded to the computing device responsive to user input selecting the UI item 218. In yet another approach, the particular related content item may be opened in a second application on the computing device responsive to user input selecting the UI item 218. The second application may already be running on the computing device, or may be initiated in response to user input selecting the UI item 218.

In this example, UI item 218 is shown as a small representation of a video camera, and corresponds to accessing a digital video of the video shown projected behind the person 208 delivering the speech. The video is made available and/or copied to the computing device for a period of time corresponding to the time range for related content indicator 214 in one implementation.

In many approaches, text information may be included with or in place of UI item 218 for describing or providing a description of the availability of the particular related content item. This text information may further include a time indicator that indicates an amount of time that the particular related content item is available for access on the computing device. The time indicator may be a graphical representation of a digital timer or clock, a countdown timer, represented by flashing of the UI item 218, changing colors of UI item 218, etc. The effects displayed on the UI item 218 may increase in intensity as the timer decreases closer to zero.

In one approach, UI item 218 may be presented based on determining that a current time index of the media presentation 204 corresponds to a start time for allowing access to the particular related content item while presenting media presentation 204.

In another approach, the particular related content item for this portion of the media presentation 204 is automatically downloaded and/or copied to the computing device responsive to a start time in the media presentation being reached for allowing access to the particular related content item (denoted by the beginning of related content indictor 214). In an approach, the particular related content item may be automatically downloaded and/or copied to the computing device concurrent to presenting UI item 218 in display 224 indicating presence of the particular content item being made available on the computing device.

In various approaches, UI item 218 may be presented by application 202 or some other application of the computing device, UI item 218 may be presented within media presentation 204, or UI item 218 may be presented by an operating system of the computing device executing application 202 and/or presenting media presentation 204.

Figure 2C:
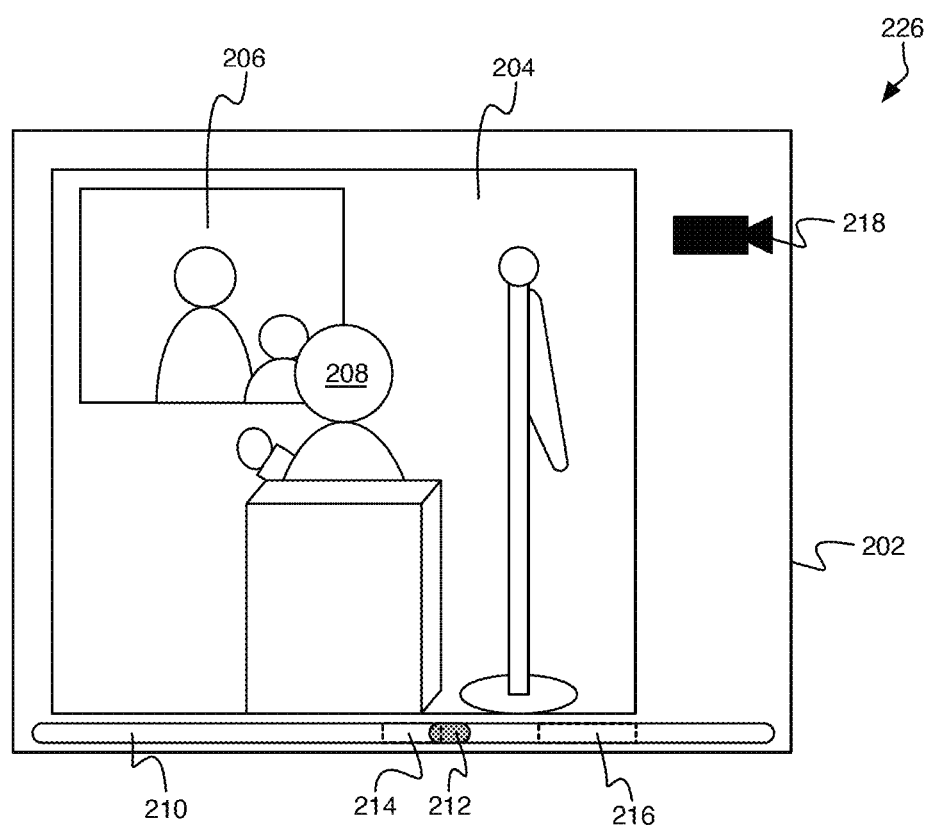

FIG. 2C depicts display 226 that includes application 202 presenting media presentation 204 at a time within the time range for the particular related content item corresponding to related content indicator 214. As shown, UI item 218 is still displayed and operable to access the particular content item corresponding to related content indicator 214.

In an approach, UI item 218 may be presented at all times during an extent of presenting media presentation 204, rather than only at times of related content indicator(s). In a further approach, UI item 218 may be presented with an altered appearance indicating that UI item 218 is disabled and inoperable to access the particular related content item during time ranges outside of the time range for related content indicator 214.

Figure 2D:
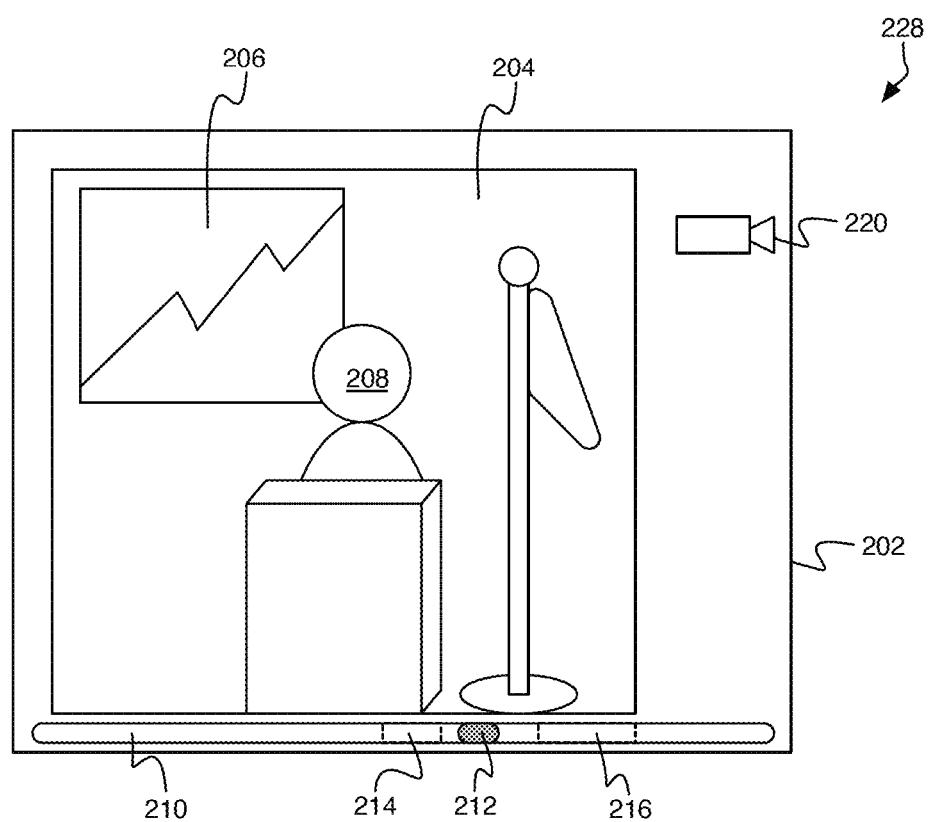

FIG. 2D depicts display 228 where UI item 220 is presented with an altered appearance indicating that UI item 220 is disabled and inoperable to access any related media items available for media presentation 204. This altered appearance for UI item 220 is shown during time ranges outside of time ranges for allowing access to the particular related content item for related content indicator 214 and for allowing access to a particular content item for related content indicator 216. This situation is shown on progress bar 210 by present time indicator 212 being positioned after the time range for related content indicator 214 and prior to the time range for related content indicator 216.

The altered appearance may include, but is not limited to, graying-out UI item 220, displaying an "X" or crossing-out UI item 220, displaying UI item 220 in a different color than when it is operable to access the particular related content item, including text or description indicating inoperability of UI item 220, etc.

Figure 2E:
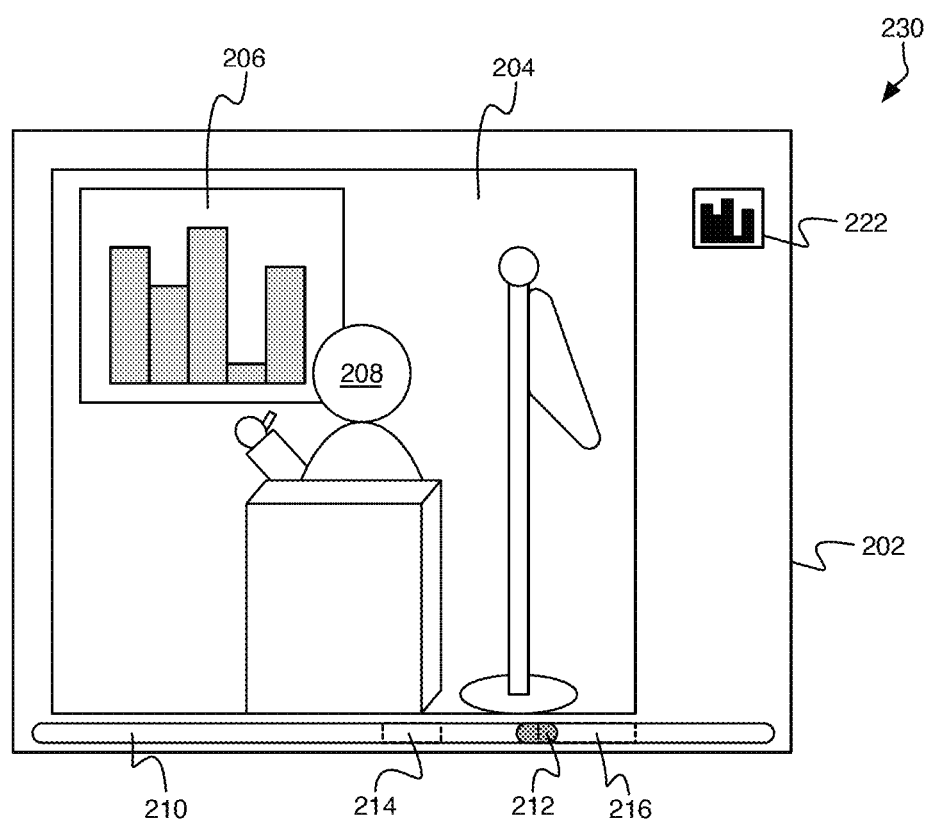

FIG. 2E depicts display 230 where UI item 222 is presented and operable to access the particular related media item corresponding to related content indicator 216. In this example, UI item 222 is shown as a small chart, and corresponds to accessing a digital version of the chart shown projected behind the person 208 delivering the speech. The chart is made available and/or copied to the computing device for a period of time corresponding to the time range for related content indicator 216 in one implementation.

Although a video camera and a chart are shown in the various figures as UI items, any shape, text, graphic, logo, image, and/or combination thereof may be used in a UI item to indicate availability of related content item(s). A simple geometric shape like a square, triangle, rectangle, circle, etc., may be used. The shape may be shown in addition to a text description displayed on or near the shape, in some approaches. Any desired effect may also be used to further enhance the UI item, such as shading, 3D representation, dynamic or moving features, etc.

Figure 3A:
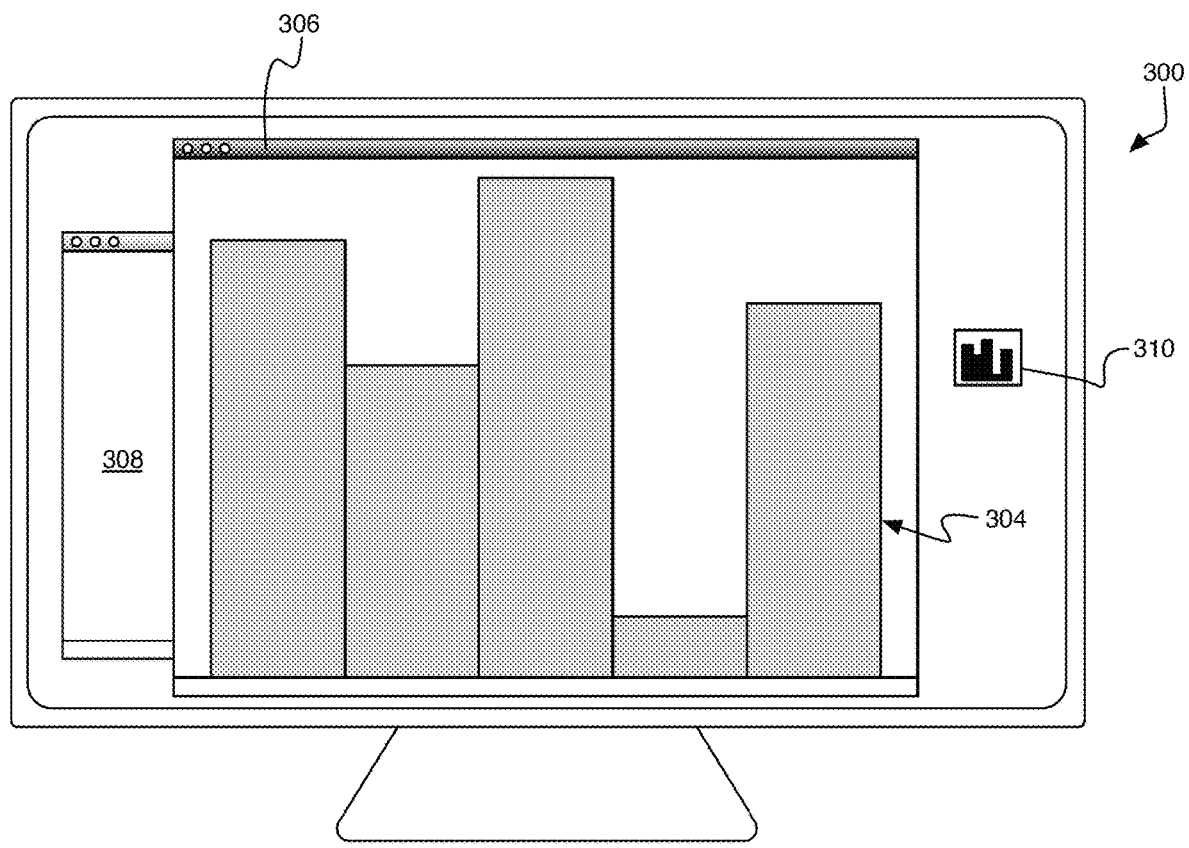
FIGS. 3A-3E show several examples for displaying a UI item for indicating a related content item in conjunction with a media presentation.

FIGS. 3A-3E show several examples for displaying a UI item for indicating a related content item in conjunction with a media presentation. FIG. 3A depicts display device 300 showing a first application 306 displaying media presentation 304. Display monitor 308 may display one or more other applications, windows, or tabs (collectively 308) which may be related to or unrelated to application 306 in several examples. As shown, the media presentation 304 is showing a chart that occupies an extent of a display area for application 306.

Although application 306 is shown presenting a chart in FIGS. 3A-3E, embodiments are not so limited, as any audio and/or visual data may be included in a media presentation 304, with each media presentation capable of being enhanced with related content as described herein in various embodiments.

In FIG. 3A, display monitor 300 also presents an example UI item 310 indicating availability of related content item for a currently-displayed portion of media presentation 304. In this example, UI item 310 is a small chart that represents the related content item available to the user, e.g., the presently-displayed chart in the media presentation 304. In one embodiment, as shown in FIG. 3A, UI item 310 may be shown on display monitor 300 at a position that is outside of media presentation 304. In a further approach, UI item 310 may be shown on display monitor 300 at a position that is outside of application 306 used to display media presentation 304.

Figure 3B:
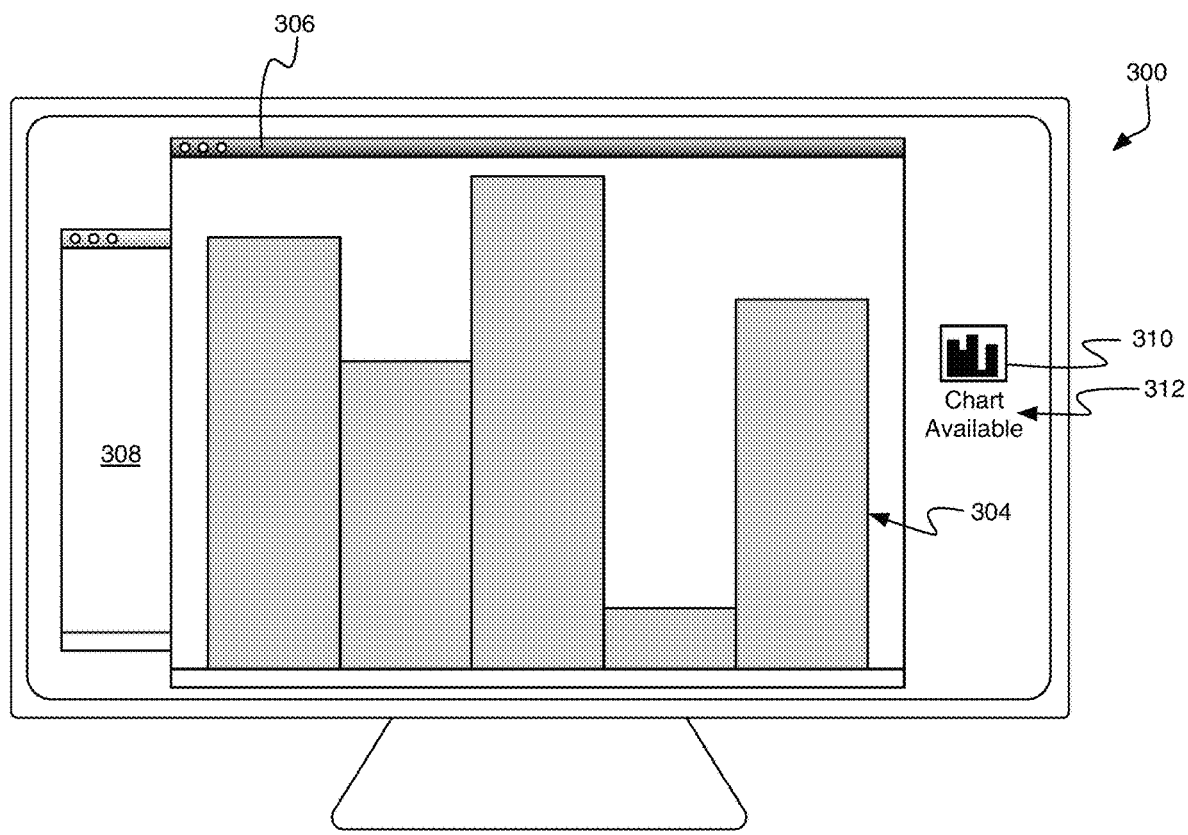

FIG. 3B shows display monitor 300 presenting example UI item 310 along with description information 312. As shown, the description information indicates "Chart Available," clearly announcing a purpose of UI item 310. More descriptive information may be included, alone or in combination with a UI item 310, such as a full description of what related content item(s) are available for the media presentation 304 currently playing.

Figure 3C:
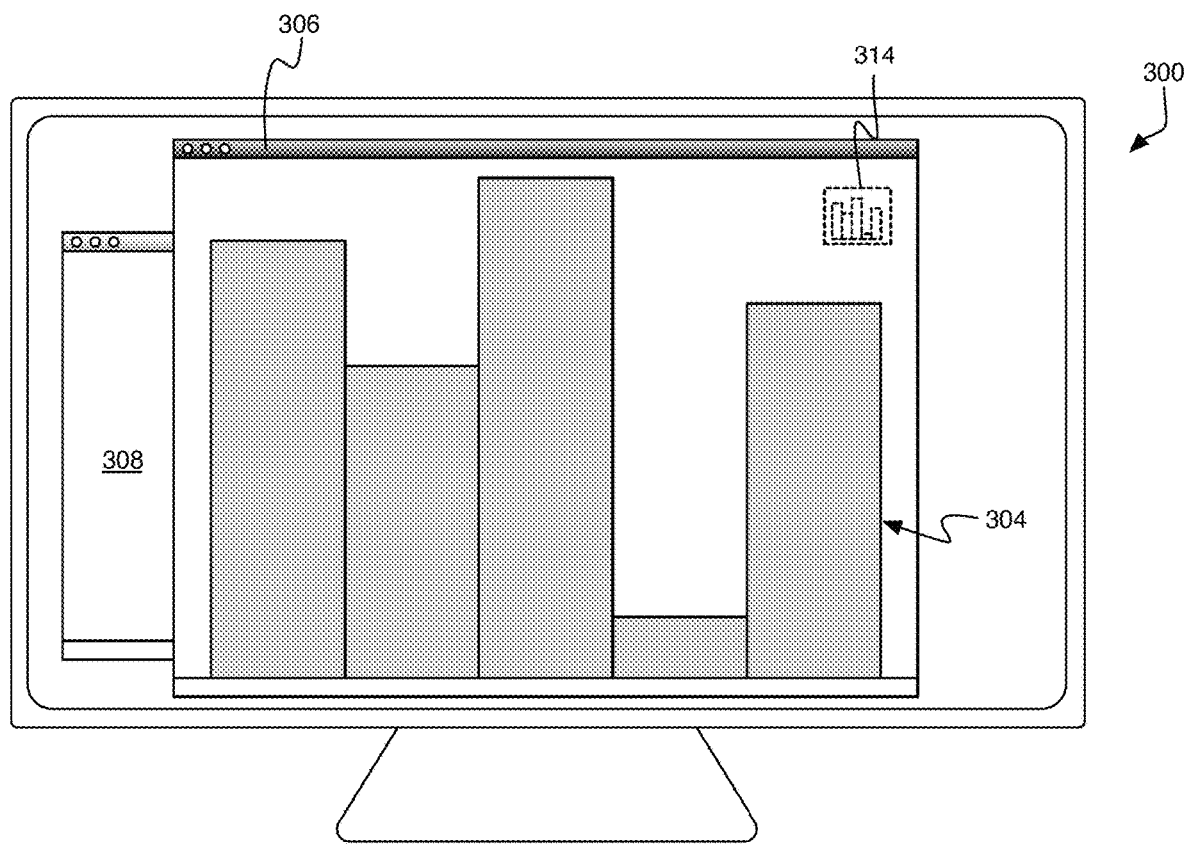

FIG. 3C shows display device 300 presenting example UI item 314 superimposed in front of media presentation 304. As shown, UI item 314 is semi-transparent, allowing content of the media presentation 304 located behind UI item 314 to remain visible. UI item 314 may be semi-transparent regardless of where it is displayed on display device 300. In other approaches, UI item 314 may be opaque when presented in front of the media presentation 304, elsewhere in application 306, or at any position on display device 300.

Figure 3D:
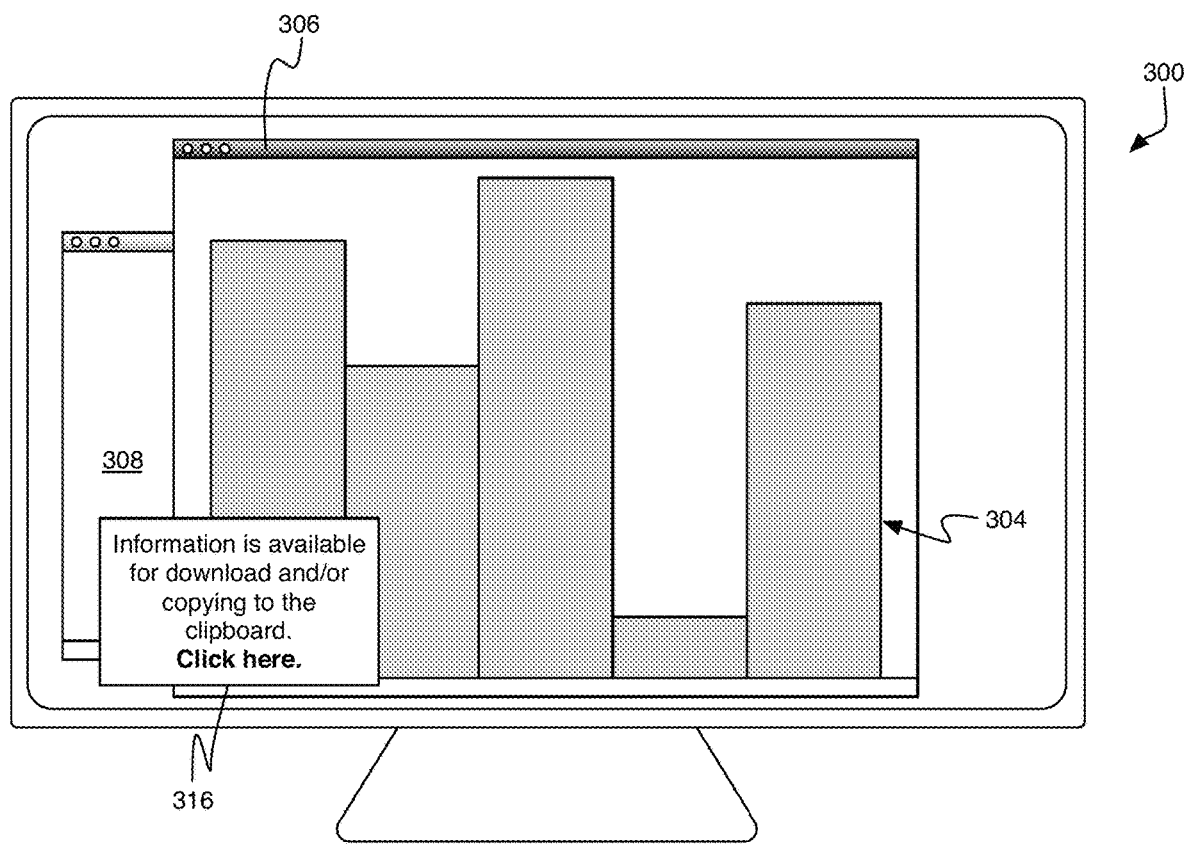

FIG. 3D shows display device 300 presenting example UI item 316 showing description information. UI item 316 is displayed in front of application 306 and other applications 308 as a pop-up window. UI item 316 may be displayed in any orientation or arrangement, in accordance with capabilities of the application 306 and/or media presentation 304. As shown, the description information indicates "Information is available for download and/or copying to the clipboard" and that a user should "Click here" to access the information. Responsive to a user clicking on a specific portion of UI item 316 (or UI item 316 generally) causes the information to be downloaded and/or copied to the clipboard of computing device controlling display device 300.

Figure 3E:
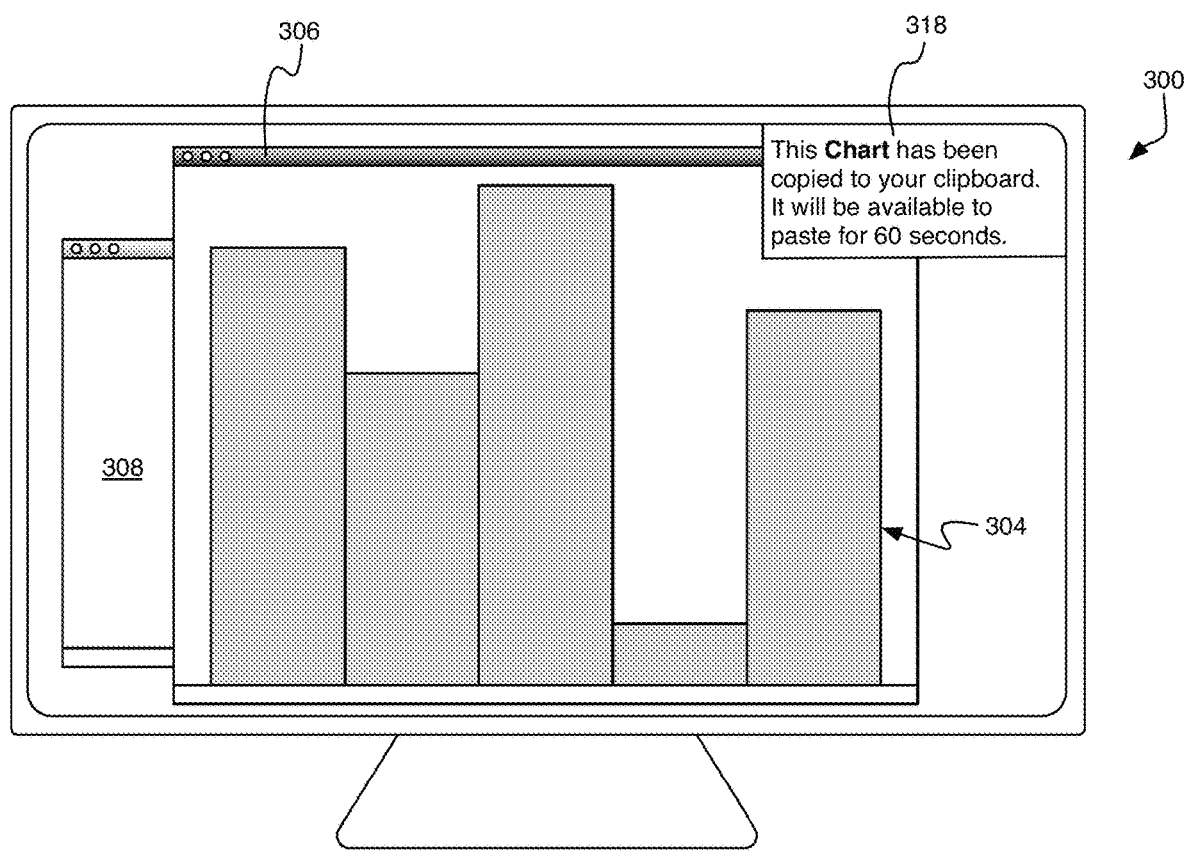

FIG. 3E shows display device 300 presenting example UI item 318 showing description information. UI item 318 is displayed in front of application 306 as a drop-down notification from an operating system of the display device 300. UI item 318 may be displayed in any orientation or arrangement, in accordance with capabilities of the application 306 and/or operating system. As shown, the description information indicates "This Chart has been copied to your clipboard" and that "It will be available to paste for 60 seconds." A user does not need to perform any action in order for the related content item (the chart) to be made available to the computing device, as it is automatically copied to the clipboard of the computing device.

In FIG. 3E, example UI item 318 indicates that the related content item is available for a limited amount of time, e.g., 60 seconds. In any embodiment, related content item(s) may be available for access by a user for only a limited amount of time. The amount of tie may be related to a duration that related content is displayed in the media presentation 304, a predetermined amount of time, the display time plus an amount of time thereafter, etc.

Figure 4A:
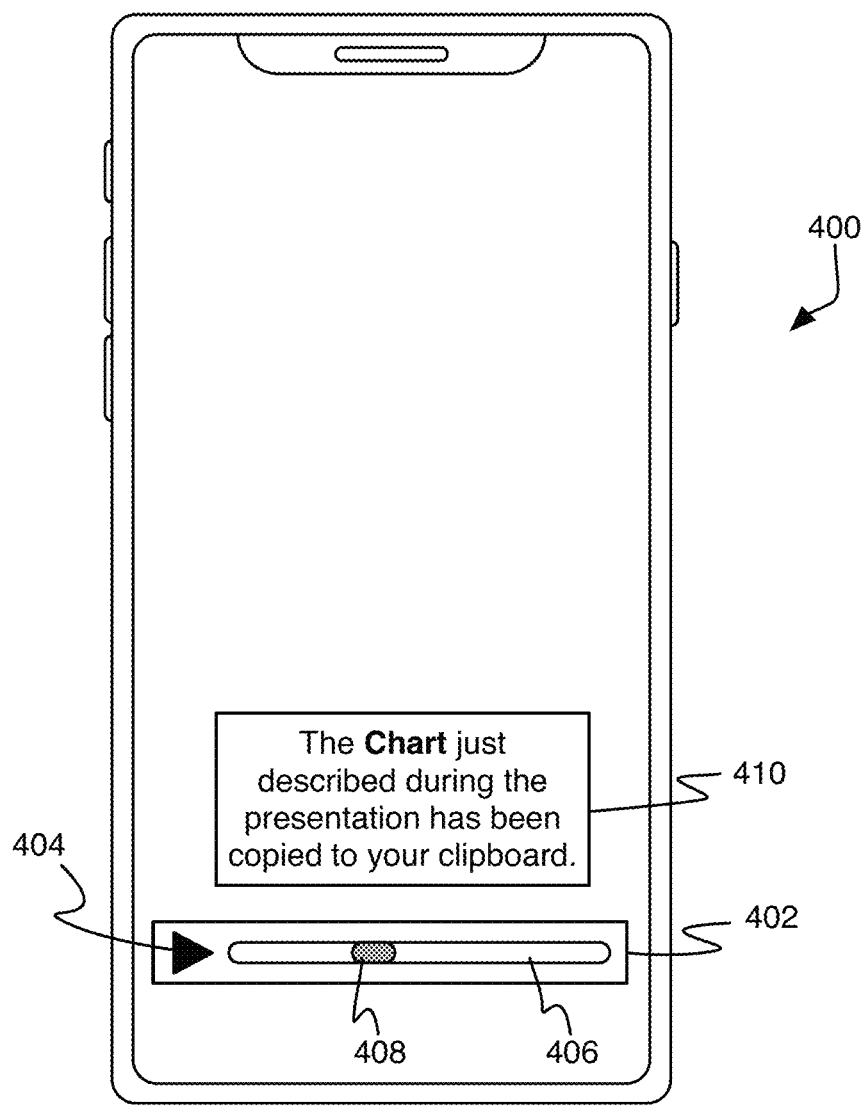
FIGS. 4A-4C depict a mobile device displaying example interfaces configured for use with media presentations, in accordance with various approaches.
Figure 4B:
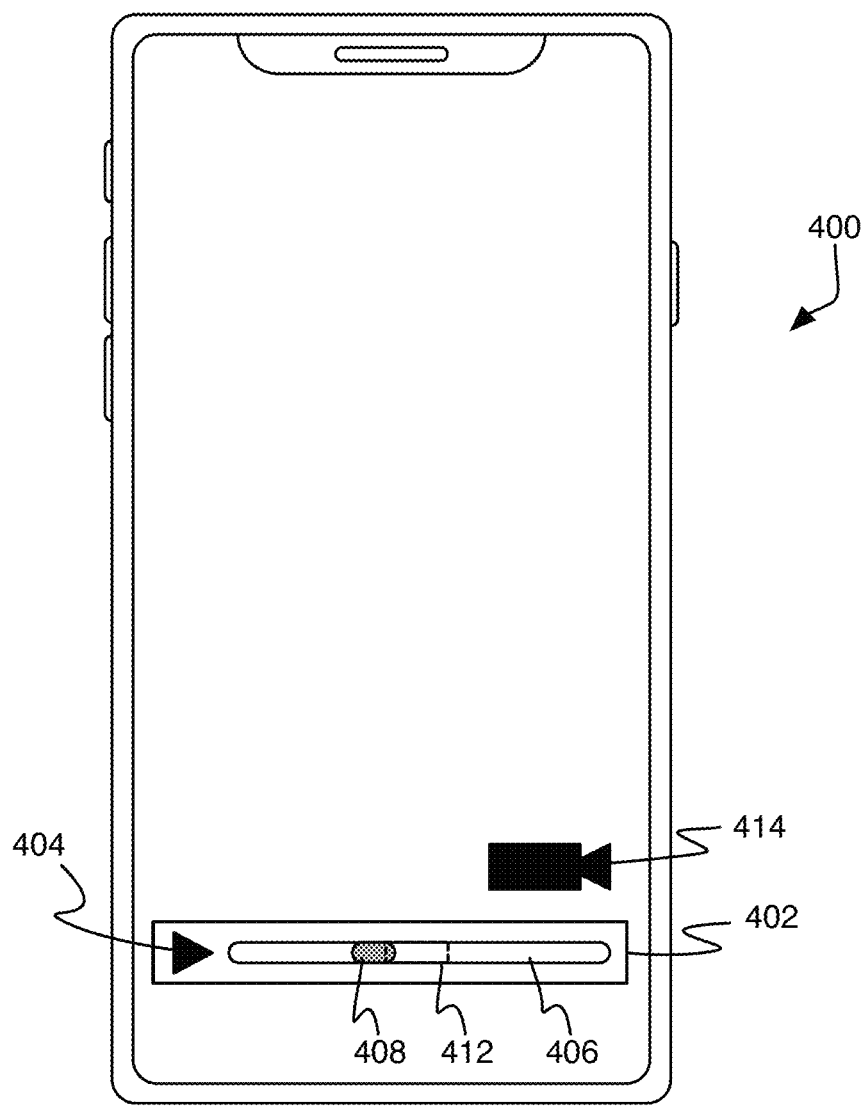
Figure 4C:
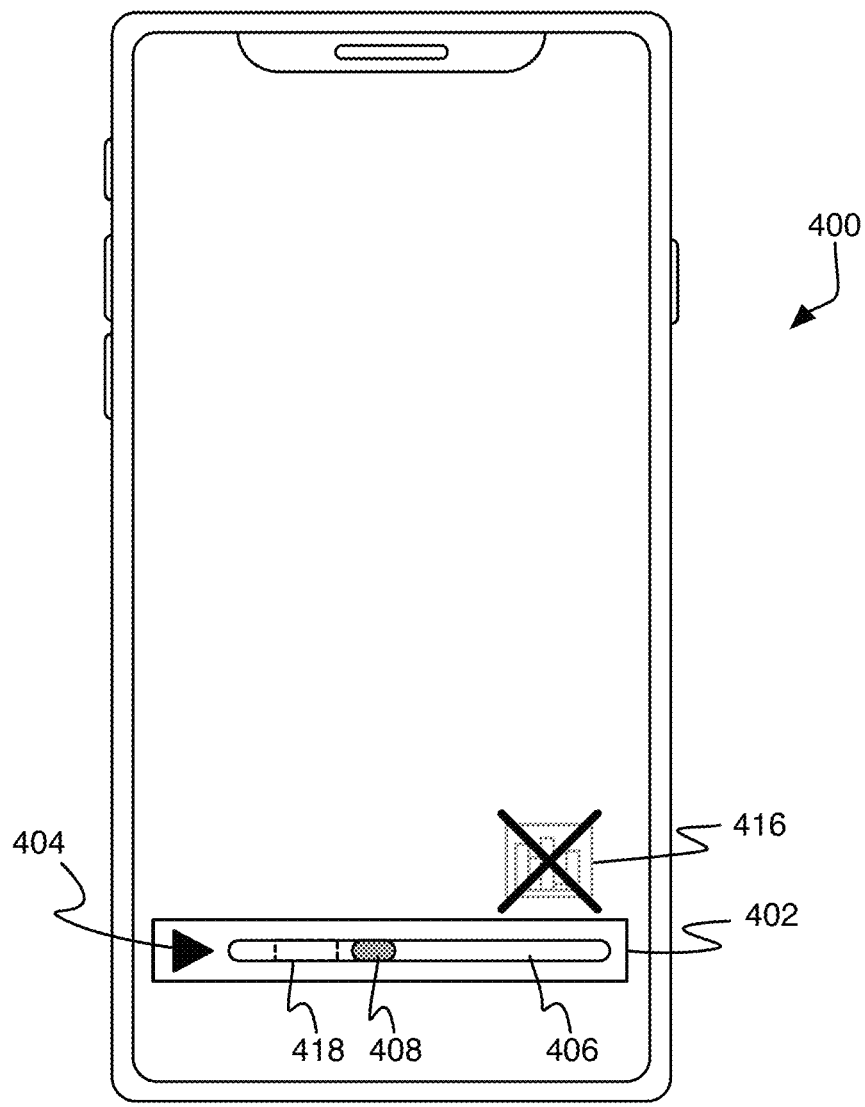

FIGS. 4A-4C depict a mobile device 400 displaying example interfaces configured for use with media presentations, in accordance with various approaches. FIG. 4A depicts a media player application 402 for playback of an audio presentation being displayed on the mobile device 400. The media player application 402 includes a playback UI item 404 and a present time indicator 408 that is displayed along a progress bar 406 for indicating progress of the audio presentation. In this embodiment, a related content indicator 410 displays information about a related content item that is available to the mobile device in response to a portion of the audio presentation being played by the media player application 402.

In one example, related content indicator 410 shows text stating that "The Chart just described during the presentation has been copied to your clipboard." This example message may reflect any message that describes and/or corresponds to related content item(s) that are automatically copied and/or made available to the mobile device 400 in various approaches.

In one embodiment, during an audio presentation, an audible or non-visual indicator may be used to indicate that a related content item has been downloaded and/or copied to a clipboard of a device playing the audio presentation (or some other related device) for use by the user, e.g., pasting the content item into an application.

In another embodiment, during an audio presentation, the related content item may be downloaded and/or copied to a clipboard of a device playing the audio presentation (or some other related device) for use by the user without visual or audible notification.

FIG. 4B depicts a UI item 414 for indicating availability of a related content item in conjunction with presentation of the media presentation on the media player application 402. In one approach, the UI item 414 is displayed in response to the present time (as indicated by present time indicator 408) being within a time range for allowing access to a related content item (as indicated by a related content indicator 412 shown along the progress bar 406). In another approach, the UI item 414 may be displayed at all times during presentation of the media presentation, possibly with functionality limited or disabled at times outside of the time range indicated by the related content indicator 412.

In this embodiment, user input selecting the UI item 414 causes the mobile device 400 to download or copy the related content item to a memory or clipboard of the mobile device 400. As shown, the UI item 414 is displayed on a screen of the mobile device 400 outside of an area used for the media player application 402. In other approaches, the UI item 414 may be displayed upon the media player application 402, superimposed above the media player application 402, provided in a menu of the mobile device 400, provided in a pop-up window or notification, etc.

In a further embodiment, a related content indicator may display description information describing functionality of the UI item 414 and/or what information is available for download/copying to the mobile device 400 or placement into an application.

FIG. 4C depicts a UI item 416 for indicating unavailability of a related content item in conjunction with presentation of the media presentation on the media player application 402. In one approach, the UI item 416 may be grayed-out, crossed-out, have color changed, have shape or UI item changed, and/or have a cross or "X" superimposed thereon to indicate that the related content item is not available for access. In one approach, this alteration to the UI item 416 may be generated in response to the present time (as indicated by present time indicator 408) being outside of the time range for allowing access to the related content item (as indicated by the related content indicator 418 shown along the progress bar 406).

In this embodiment, user input selecting the UI item 416 will not cause any action related to the related content item. As shown, the UI item 414 is displayed on a screen of the mobile device 400 outside of an area used for the media player application 402. In other approaches, the UI item 414 may be displayed upon the media player application 402, superimposed above the media player application 402, provided in a menu of the mobile device 400, provided in a pop-up window or notification, etc.

In a further embodiment, a related content indicator may display description information describing that access to the related content item is not currently available.

Figure 5:
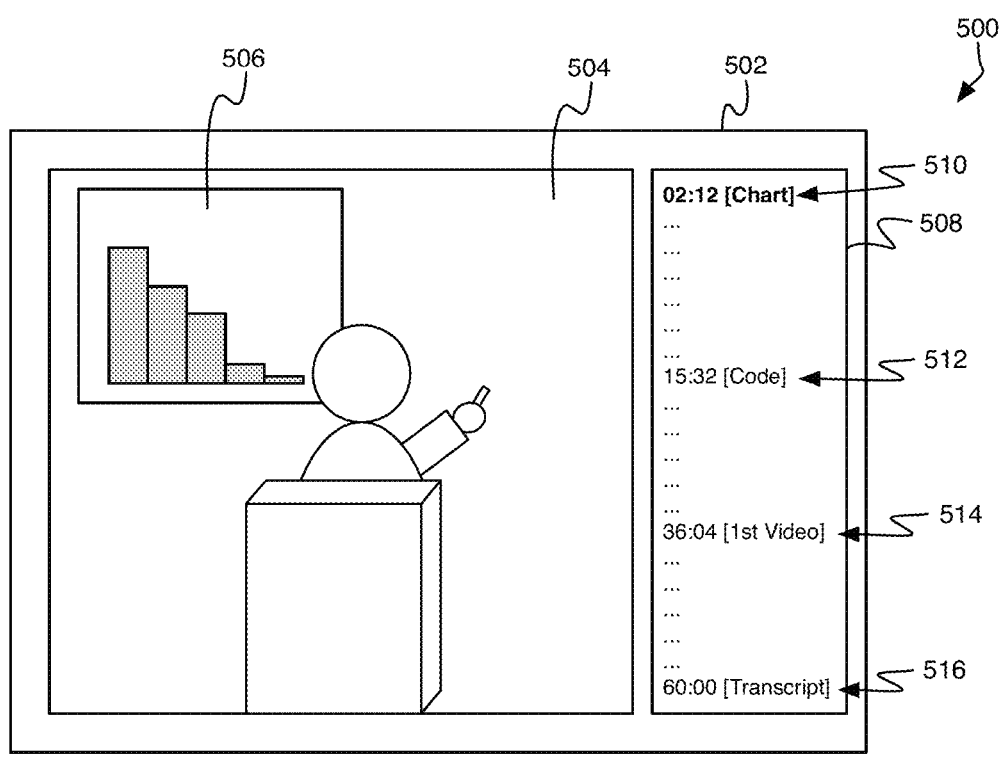
FIG. 5 shows an example timeline presented in conjunction with a media presentation.

FIG. 5 shows an example timeline 508 presented in conjunction with a media presentation 504 by a user device. The media presentation 504 may include additional visual content 506 in some embodiments. The timeline 508 includes related content item indicators 510, 512, 514, 516 marking time periods within the media presentation 504 in which related content item(s) are available for the user. In one approach, these related content item indicators 510, 512, 514, 516 are UI items selectable for performing an action. In this approach, selection of any of the related content item indicators 510, 512, 514, 516 may cause the user device to access related content item(s) that correspond to the selected content item indicator. Access may include downloading the related content item, copying the related content item to a clipboard, opening the related content item in an application, etc.

Any of the related content item indicators 510, 512, 514, 516 may be disabled until a portion of the media presentation 504 is played back, and a present related media content item may then become accessible. In an approach, all related content item indicators are indicated as being disabled, and a particular related content item indicator is not indicated as being enabled until a corresponding portion of the media presentation 504 is played back. In a further approach, once a related content item indicator has been activated, it remains accessible for the remainder of playback of the media presentation 504.

In one approach, a presently available related content item may be indicated in the timeline 508. For example, the first related content item indicator 510 is indicated as being active (bold text) meaning that a user is currently viewing a portion of the media presentation 504 related to this content item. Other methods of indicating a presently available related content item may be used, such as flashing, color change, font change, adding a graphic, movement, etc.

In some embodiments, description information may be included with one or more of the related content item indicators 510, 512, 514, 516. For example, related content item indicator 512 includes text indicating that the related content item includes code or a code snippet that may be accessed by the user device. Some approaches allow for the code to be accessed automatically when the corresponding portion of the media presentation 504 is played. In one or more approaches, the code may be accessed responsive to selection of the related content item indicator 512 by a user.

Many different types of data, information, and/or content may be provided to the computing device during the media presentation 504. Some example types of content include, but are not limited to, charts, graphics, images, code, text, word processing documents, spreadsheet documents, database documents, videos, a transcript of the media presentation 504, etc.

In an approach, at least some of the related content items may be wholly or partially presented by the user device during the media presentation 504 (e.g., a chart in a slide presentation, music playing during an audio presentation, graphics shown during a speech, code snippet displayed in a product release, etc.). In one approach, a related content item may be supplementary to material presented in the media presentation 504 (e.g., fonts, templates, downloadable resources, beta builds of software and related code, etc.).

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 6:
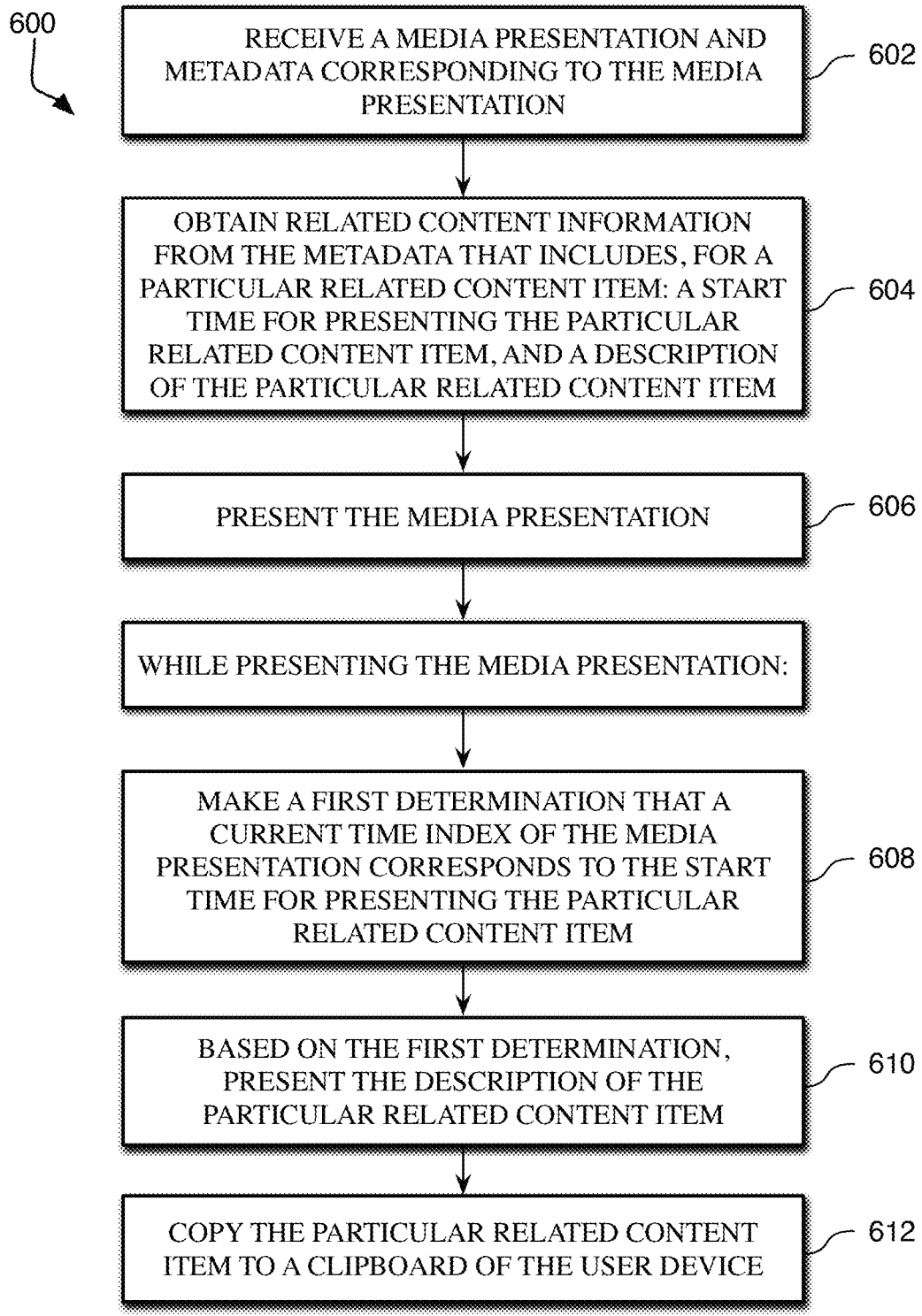
FIG. 6 is flow diagram of an example method for providing content items related to a media presentation.

FIG. 6 is flow diagram of an example method 600 for providing content items related to a media presentation. Method 600 may be performed by a mobile device, a media device, one or more processors of a computing device, an application operating on a computing device, a server device, a hardware processor, and/or a combination thereof. In FIG. 6, method 600 is described as being performed by a user device for simplicity, but one or more devices may work together to perform method 600.

At step 602, a user device receives and/or obtains a media presentation and metadata corresponding to the media presentation. The metadata includes related content information and/or related content item(s) associated with particular portions of the media presentation. In some approaches, one or more of the related content items may relate to the media presentation generally, such as a transcript, a digital copy of a slideshow presentation, information about presenter(s) in the media presentation, etc.

At step 604, the user device obtains related content information from the metadata. The related content information includes, for a particular related content item: a start time for presenting the particular related content item, and a description of the particular related content item.

The start time may be a beginning of the media presentation, in one approach, or any other time within the media presentation that a designer wishes for the related content item to be made available to the user device.

At step 606, the user device presents the media presentation. For a visual presentation, a display or monitor may be used to display the presentation alone or in combination with audio content played through speaker(s). For an audio presentation, the user device may broadcast the presentation using speaker(s) of the user device alone or in combination with some visual content, like progress bar, cover art, etc.

Steps 608, 610, and 612 are performed while presenting the media presentation. At step 608, the user device makes a first determination that a current time index of the media presentation corresponds to the start time for presenting the particular related content item.

At step 610, based on the first determination, the user device presents the description of the particular related content item. The description of the particular related content item may include a title, identification of content type, size, timestamp for the content, etc. In one approach, the related content information includes the particular related content item for access by the user device. In some approaches, the user device may include a UI item for causing access to the particular related content item(s).

At step 612, the user device copies the particular related content item to a clipboard of the user device. In one approach, the particular related content item is automatically copied to the user device based on the first determination.

In alternate approaches, depending on the content type, the particular related content item may be downloaded, opened in an application, accessed automatically by the user device, etc., with user input in some embodiments, or without user input in alternate embodiments.

Method 600 may further include, in one or more embodiments, the user device presenting, based on the first determination, a UI item for accessing the particular related content item. Moreover, the user device may receive user input selecting the UI item prior to copying the particular related content item to the user device. In this approach, the particular related content item is copied to the clipboard of the user device responsive to the user input.

Method 600 may further include, in one or more embodiments, while presenting the media presentation: the user device making a second determination that the current time index of the media presentation corresponds to an end time for ceasing presentation of the particular related content item. Based on the second determination, the user device will discontinue presentation of the description of the particular related content item.

In a further approach, the particular related content item may be unavailable for copying to the clipboard of the user device after the current time index of the media presentation exceeds the end time. In other words, the second determination effectively ends access to the particular content item for the user device.

Moreover, in some approaches, the user device may remove the particular related content item from the clipboard of the user device responsive to the second determination.

Method 600 may further include, in one or more embodiments, the user device receiving user input indicating to paste the particular related content item into an application executing on the user device. In response to this user input, the user device pastes the particular related content item into the application executing on the user device.

In another embodiment, method 600 may include the user device receiving a timeline of the media presentation. The timeline includes a user interface item selectable to cause download of the particular related content item. In addition, the user interface item is displayed on the timeline at a respective position for presentation data that corresponds to the respective content item.

Figure 7:
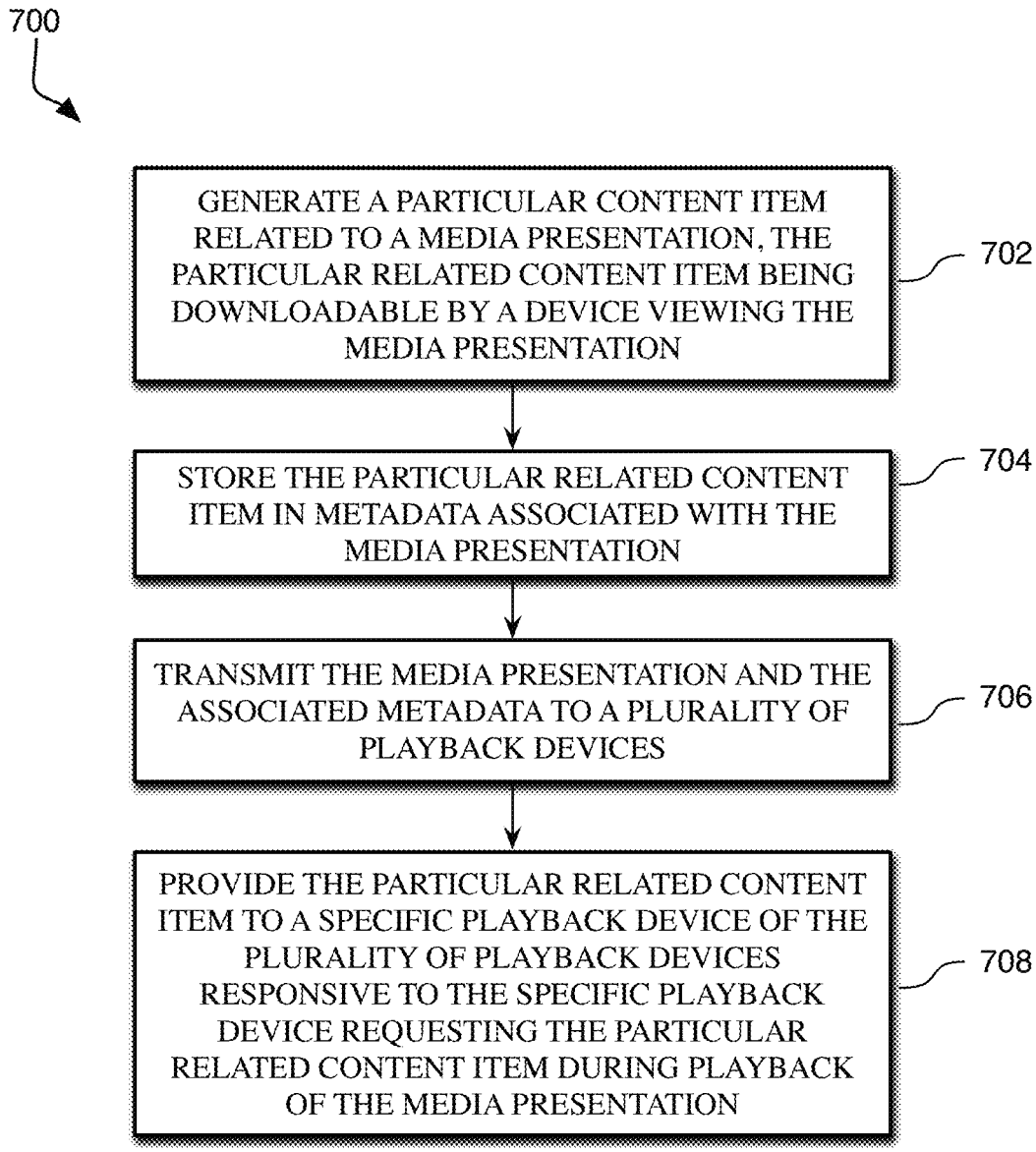
FIG. 7 is flow diagram of an example method for providing content items related to a media presentation.

FIG. 7 is flow diagram of an example method 700 for providing content items related to a media presentation. Method 700 may be performed by a computing device, a mobile device, a media device, one or more processors of a computing device, an application operating on a computing device, a playback device, a server device, a hardware processor, and/or a combination thereof. In FIG. 7, method 700 is described as being performed by a computing device for simplicity, but one or more devices may work together to perform method 700.

At step 702, the computing device generates a particular related content item related to a media presentation. The particular related content item is downloadable by a playback device viewing the media presentation.

The computing device may generate the media presentation by recording a presentation live, obtaining a presentation already created and modifying it with related content item(s), assembling from various content portions and inserting related content items for the various content portions, etc. The computing device may integrate insertion points for related content items into metadata for the media presentation, and format the media presentation and metadata according to a particular standard for consumption by one or more playback devices.

The insertion points may be determined based on predetermined markers or ques (e.g., words, graphics displayed, content discussed, etc.) being reached in the media presentation, based on duration or time points being reached in the media presentation, manually entered by an administrator creating the presentation, etc.

At step 704, the computing device stores the particular related content item as metadata in association with the media presentation. Other information, configuration data, structural details, etc., may be included in the metadata along with the particular related content item.

At step 706, the computing device transmits the media presentation and the associated metadata to a plurality of playback devices. This transmission may utilize wireless or wired networks, the Internet, direct connections between devices, uploading to a website or data repository, etc.

At step 708, the computing device provides the particular related content item to a particular playback device of the plurality of playback devices responsive to the particular playback device requesting the particular related content item during playback of the media presentation. This request may comprise selection of a UI item displayed on the user device by or in conjunction with the media presentation.

Method 700 may include, in one or more embodiments, the computing device determining one or more time ranges for allowing access to the particular related content item. Each time range includes a start time (which may be a beginning of the media presentation or any time thereafter but prior to the end time) and an end time (which may be an end of the media presentation or any time before the end but after the start time). Moreover, the computing device may provide a user interface item within the media presentation, at least during each time range. The user interface item may be selectable to cause download of the particular related content item and/or provided to indicate automatic copying and/or accessing of the particular related content item.

In one approach, the particular related content item may be accessible to the plurality of playback devices only during time range(s) associated with the particular related content item. In an alternate approach, the particular related content item may be accessible to the plurality of playback devices at all times during the media presentation.

In a further embodiment, the particular related content item may be accessible to the plurality of playback devices after presenting the media presentation, possibly for a predetermined period of time. Thereafter, the particular related content item may be removed, deleted, or otherwise revoked from the plurality of playback devices.

In an approach, the particular related content item may be inaccessible to the plurality of playback devices outside of the time range(s) associated with the particular related content item.

According to one approach, the user interface item may be displayed within the media presentation during an extent of the media presentation and the user interface item may be displayed outside of the time range(s) associated with the particular related content item with an altered appearance indicating that the user interface item is disabled and inoperable to access the particular related content item.

In one approach, the computing device may download the particular related content item to a particular playback device by placing the particular related content item in a clipboard of the particular playback device.

Method 700 may include, in one or more embodiments, the computing device transmitting a timeline of the media presentation to the playback devices. A user device, upon receiving the timeline, may present a graphical representation of the timeline. In one approach, the user device generates the graphical representation based on the timeline received by the computing device. In another approach, the timeline may include the graphical representation to display to a user.

Moreover, in some approach, the user device may provide a UI item along the graphical representation of the timeline that is selectable to cause download of the particular related content item. This UI item may be provided by the computing device along with the timeline, or may be generated by the user device to represent the particular related content item. The UI item is displayed along the timeline at a respective position (time elapsed or remaining) of a portion of the media presentation that corresponds to the particular related content item.

The timeline may include a plurality of UI items, each of the UI items being selectable to cause download of a respective related content item to a respective playback device. Each of the UI items are displayed on the timeline at respective positions related to portions of the media presentation that correspond to respective content items.

Moreover, in some approaches, a time range for accessing the particular related content item may be based on a duration and point in time of the media presentation, and each UI item may be shown on the timeline at their respective time ranges.

In one example, a media presentation may include a product reveal performed live and broadcast to one or more user devices. As the media presentation is performed and transmitted to the various user devices, an administrator may choose when to allow the user devices to access particular related content items for use on the various user devices. The related content items may be inserted as metadata into the media presentation via manual insertion, based on time markers being reached in the media presentation, or based on certain ques being reached in the media presentation, like discussion of the content during the media presentation.

In this example, once the related content item has been made available to the user devices, it may be automatically copied to a clipboard of the user devices, downloaded, and/or loaded into an application on the user devices. In another example, once the related content item has been made available to the user devices, in response to user input through the media presentation or some other aspect of the user device, the related content item may be copied to a clipboard of the user device, downloaded, and/or loaded into an application on the user device.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve the output signal provided to a display device. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve and/or refine the output signal of a media device or mobile device provided to a display device for display thereon. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services for refining the output signal of a media device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the output signal provided to the display device may be refined by inferring preferences based on non-personal information data or a bare minimum amount of personal information, such as the content being requested by the device associated with a user, other non-personal information available to the calibration services, or publicly available information.

Example System Architecture

Figure 8:
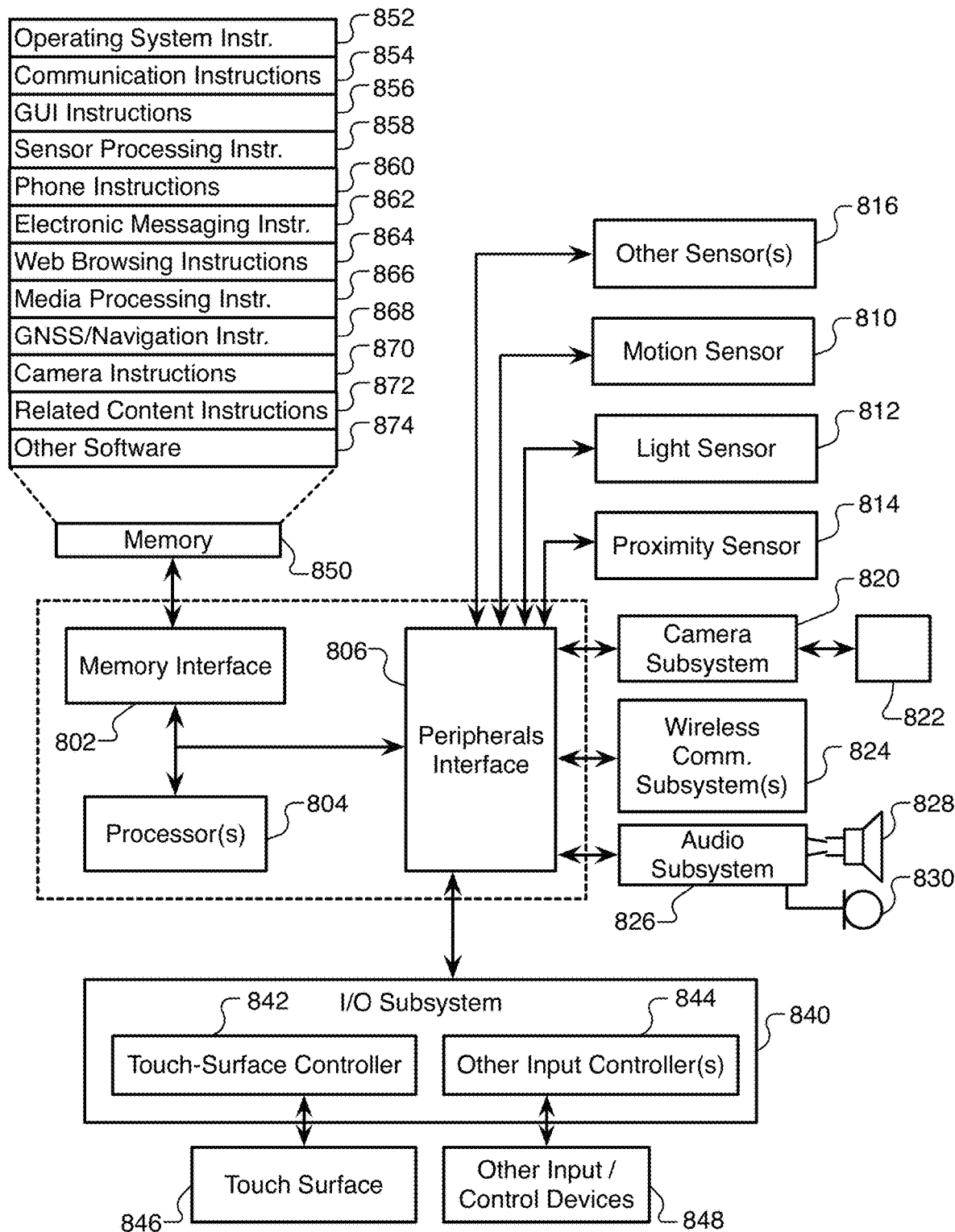
FIG. 8 is a block diagram of an example computing device that can implement the features and processes of FIGS. 1-7.

FIG. 8 is a block diagram of an example computing device 800 that can implement the features and processes of FIGS. 1-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the system device 100 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voiceprinting and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™.

The memory interface 802 can be coupled to memory 850. The memory 850 can include high-speed random-access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing calibration of an output signal for display. For example, operating system 852 can implement the calibration features as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store software instructions 872 to facilitate other processes and functions, such as providing related content item(s) in a media presentation as described with reference to FIGS. 1-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

To aid the Patent Office and any readers of any patent issued on this application in interpreting the claims appended hereto, Applicant wishes to note that it does not intend any of the appended claims or claim elements to invoke 35 U.S.C. § 112(f) unless the words "means for" or "step for" are explicitly used in the particular claim.

What is claimed is:

1. A method, comprising:
   receiving, by a user device, a media presentation and metadata corresponding to the media presentation;
   obtaining, by the user device, related content information from the metadata, wherein the related content information includes, for a particular related content item that is related to the media presentation: a start time associated with the particular related content item;
   presenting, by the user device, the media presentation; and
   while presenting the media presentation:
      making a first determination, by the user device without user input, that a current time index of the media presentation corresponds to the start time associated with the particular related content item; and
      based on the first determination that the current time index of the media presentation corresponds to the start time associated with the particular related content item:
         automatically copying, by the user device, the particular related content item to a clipboard of the user device to allow the user to paste the particular related content item therefrom.

2. The method as recited in claim 1, wherein the related content information comprises the particular related content item for access by the user device.

3. The method as recited in claim 1, further comprising:
   presenting, by the user device, a user interface (UI) item for accessing the particular related content item based on the first determination; and
   receiving, by the user device, user input selecting the UI item, wherein the particular related content item is copied to the clipboard of the user device responsive to the user input.

4. The method as recited in claim 1, wherein the particular related content item is automatically copied to the clipboard of the user device based on the first determination without user input requesting that the particular content item be copied to the clipboard of the user device.

5. The method as recited in claim 1, further comprising, while presenting the media presentation:
   based on the first determination: presenting, by the user device, a description of the particular related content item;
   making a second determination, by the user device, that the current time index of the media presentation corresponds to an end time associated with the particular related content item; and
   based on the second determination, discontinuing presentation, by the user device, of the description of the particular related content item.

6. The method as recited in claim 1, further comprising, while presenting the media presentation:
   making a second determination, by the user device, that the current time index of the media presentation corresponds to an end time associated with the particular related content item, wherein the related content information includes the end time associated with the particular related content item; and
   based on the second determination, restricting, by the user device, the user from pasting the particular related content item from the clipboard of the user device after the current time index of the media presentation exceeds the end time.

7. The method as recited in claim 6, wherein the particular related content item is removed from the clipboard of the user device responsive to the second determination.

8. The method as recited in claim 1, further comprising:
   receiving, by the user device, user input indicating to paste the particular related content item into an application executing on the user device; and
   responsive to the user input: pasting, by the user device, the particular related content item into the application executing on the user device.

9. The method as recited in claim 1, further comprising:
   receiving, by the user device, a timeline of the media presentation;
   presenting, by the user device, a graphical representation of the timeline; and
   providing, by the user device, a user interface (UI) item along the graphical representation of the timeline that is selectable to cause download of the particular related content item,
   wherein the UI item is displayed along the timeline at a respective position for a portion of the media presentation that corresponds to the particular related content item.

10. A system comprising:
    one or more processors; and
    a non-transitory computer-readable medium including one or more sequences of instructions that, when executed by the one or more processors, cause the one or more processors to perform operations comprising:
       receiving, by a user device, a media presentation and metadata corresponding to the media presentation;
       obtaining, by the user device, related content information from the metadata, wherein the related content information includes, for a particular related content item that is related to the media presentation: a start time associated with the particular related content item;
       presenting, by the user device, the media presentation; and
       while presenting the media presentation:
          making a first determination, by the user device without user input, that a current time index of the media presentation corresponds to the start time associated with the particular related content item; and based on the first determination that the current time index of the media presentation corresponds to the start time associated with the particular related content item:
automatically copying, by the user device, the particular related content item to a clipboard of the user device to allow the user to paste the particular related content item therefrom.

11. The system as recited in claim 10, wherein the related content information comprises the particular related content item for access by the user device.

12. The system as recited in claim 10, wherein the one or more sequences of instructions further cause the one or more processors to perform operations comprising:
presenting, by the user device, a user interface (UI) item for accessing the particular related content item based on the first determination; and
receiving, by the user device, user input selecting the UI item, wherein the particular related content item is copied to the clipboard of the user device responsive to the user input.

13. The system as recited in claim 10, wherein the particular related content item is automatically copied to the clipboard of the user device based on the first determination without user input requesting that the particular content item be copied to the clipboard of the user device.

14. The system as recited in claim 10, wherein the one or more sequences of instructions further cause the one or more processors to perform operations, while presenting the media presentation, comprising:
based on the first determination: presenting, by the user device, a description of the particular related content item;
making a second determination, by the user device, that the current time index of the media presentation corresponds to an end time associated with the particular related content item; and
based on the second determination, discontinuing presentation, by the user device, of the description of the particular related content item.

15. The system as recited in claim 10, wherein the one or more sequences of instructions further cause the one or more processors to perform operations, while presenting the media presentation, comprising:
making a second determination, by the user device, that the current time index of the media presentation corresponds to an end time associated with the particular related content item, wherein the related content information includes the end time associated with the particular related content item; and
based on the second determination, restricting, by the user device, the user from pasting the particular related content item from the clipboard of the user device after the current time index of the media presentation exceeds the end time.

16. The system as recited in claim 15, wherein the particular related content item is removed from the clipboard of the user device responsive to the second determination.

17. The system as recited in claim 10, wherein the one or more sequences of instructions further cause the one or more processors to perform operations comprising:
receiving, by the user device, user input indicating to paste the particular related content item into an application executing on the user device; and
responsive to the user input: pasting, by the user device, the particular related content item into the application executing on the user device.

18. The system as recited in claim 10, wherein the one or more sequences of instructions further cause the one or more processors to perform operations comprising:
receiving, by the user device, a timeline of the media presentation;
presenting, by the user device, a graphical representation of the timeline; and
providing, by the user device, a user interface (UI) item along the graphical representation of the timeline that is selectable to cause download of the particular related content item,
wherein the UI item is displayed along the timeline at a respective position for a portion of the media presentation that corresponds to the particular related content item.

19. A non-transitory computer-readable medium including one or more sequences of instructions that, when executed by one or more processors, cause the one or more processors to perform operations comprising:
receiving, by a user device, a media presentation and metadata corresponding to the media presentation;
obtaining, by the user device, related content information from the metadata, wherein the related content information includes, for a particular related content item that is related to the media presentation: a start time associated with the particular related content item;
presenting, by the user device, the media presentation; and
while presenting the media presentation:
making a first determination, by the user device without user input, that a current time index of the media presentation corresponds to the start time associated with the particular related content item; and
based on the first determination that the current time index of the media presentation corresponds to the start time associated with the particular related content item:
automatically copying, by the user device, the particular related content item to a clipboard of the user device to allow the user to paste the particular related content item therefrom.

20. The non-transitory computer-readable medium as recited in claim 19, wherein the one or more sequences of instructions further cause the one or more processors to perform operations comprising:
presenting, by the user device, a user interface (UI) item for accessing the particular related content item based on the first determination; and
receiving, by the user device, user input selecting the UI item, wherein the particular related content item is copied to the clipboard of the user device responsive to the user input.

* * * * *